March 19, 1929.  O. J. HORGER  1,705,568
RAILWAY CAR TRUCK AND BRAKE MOUNTING
Filed Aug. 5, 1927  2 Sheets-Sheet 2
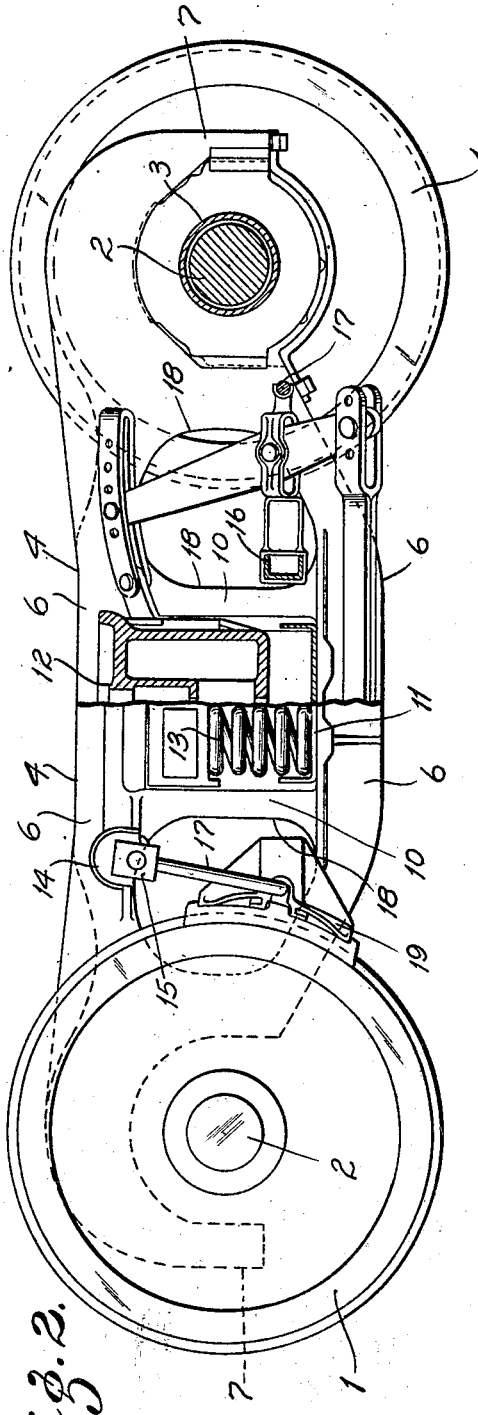
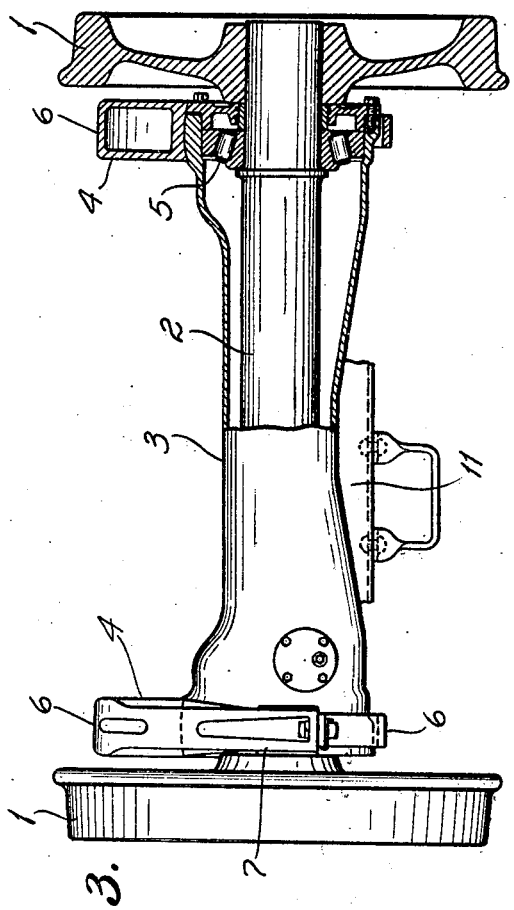
INVENTOR:
Oscar J. Horger
His Attorneys.

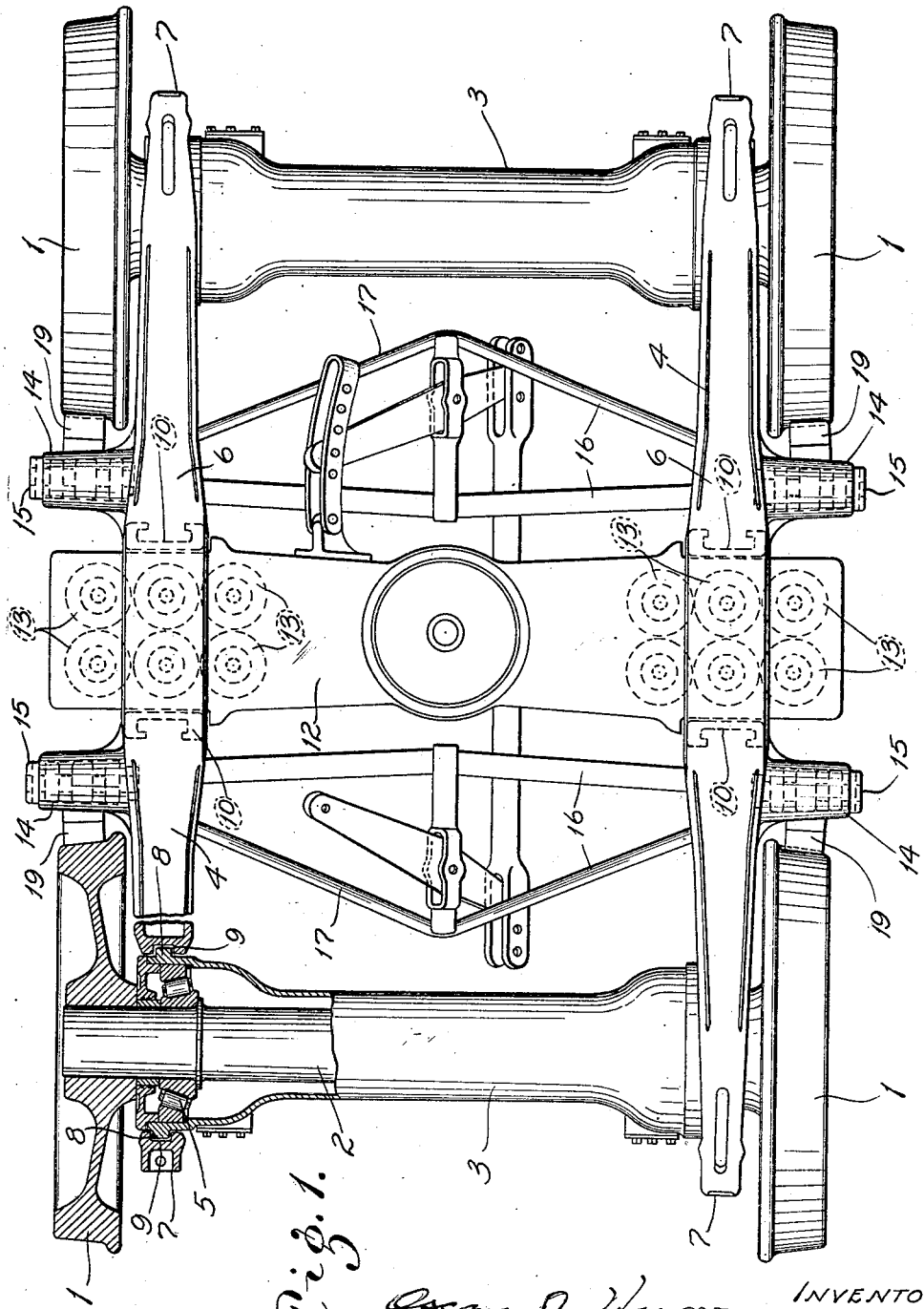

Patented Mar. 19, 1929.

1,705,568

UNITED STATES PATENT OFFICE.

OSCAR J. HORGER, OF CANTON, OHIO, ASSIGNOR TO THE TIMKEN ROLLER BEARING COMPANY, OF CANTON, OHIO, A CORPORATION OF OHIO.

RAILWAY-CAR TRUCK AND BRAKE MOUNTING.

Application filed August 5, 1927. Serial No. 210,746.

My invention relates to trucks for railway cars and the like, particularly to trucks of the inboard type: that is, in which the truck side frames are located between the wheels instead of outside the wheels. The invention has for its particular object the simplification of the brake supporting means and at the same time the elimination of any danger of the brake beam or other parts of the brake mechanism falling to the ground in case of failure of the brake supporting means. The invention consists principally in a truck in which the brake beam (or brake beams) extends through openings in the truck side frames that are sufficiently large to accommodate the necessary movement of the brake beam in applying and releasing the brakes. The invention further consists in the railway car truck and brake mounting and in the parts and combinations and arrangements of parts hereinafter described and claimed.

In the accompanying drawing,

Fig. 1 is a top plan view of a railway car truck embodying my invention;

Fig. 2 is a side elevation thereof; and

Fig. 3 is a part cross-sectional view, part end elevation thereof.

The drawings illustrate my invention embodied in a railway car truck of the inboard type in which flanged wheels 1 are fixed on the ends of axles 2 that extend through tubular axle housings 3, truck side frames indicated generally by the numeral 4 being mounted on said housings and antifriction bearings 5 preferably being interposed between the housings and the axles.

Each truck side frame 4 comprises upper and lower longitudinal members 6 that converge and are joined together near the housings, the ends of the side frame being jaw portions 7 that engage the housing in any suitable way, as by ribs 8 on the housing and grooves 9 in said jaws. Vertical members or columns 10 connect the two longitudinal members 6 of the side frames. The spring plank 11 and bolster 12 are disposed in the more or less rectangular spaces between said columns 10 and the longitudinal members 6, springs 13 being interposed between the ends of the spring plank and the bolster, all in accordance with any desired practice.

Each truck side frame 4 is provided with projecting bosses 14 near each wheel 1. To each boss 14 is pivotally secured a brake hanger 15 to whose lower end is secured one end of a brake beam 16 of any suitable construction, the beam shown being provided with a truss rod 17. The end portions of the brake beams 16 extend through the openings 18 between the vertical members or columns 10 and the converging end portions of the upper and lower longitudinal members 6 of the truck side frames 4. Said openings are large enough to permit the necessary movement of the brake beams in applying and releasing the brakes.

Brake shoes 19 of any suitable construction are secured to the brake beams and any suitable operating devices are connected therewith, a common system of linkage being shown in the drawings.

By reason of the brake beams extending through openings in the truck side frames, the usual auxiliary or safety supporting devices may be dispensed with, since in the event of failure of the supporting device and dropping of a brake beam, said brake beam will rest on the lower longitudinal member of one of the truck side frames. This construction is simple and comparatively inexpensive and at the same time it greatly minimizes the danger of serious trouble resulting from breaking of a brake supporting hanger or any other part of the brake mechanism.

Obviously numerous changes may be made without departing from the invention and I do not wish to be limited to the precise construction shown.

What I claim is:

1. A car truck comprising axle members extending from side to side of the truck, each axle member having a wheel at each end thereof, truck side frames connecting said axle members, said truck side frames having openings therethrough and a brake beam extending through said openings in said truck side frames.

2. A railway car truck comprising axles, wheels thereon, tubular housings for said axles, truck side frames connecting said housings, said truck side frames having openings therethrough and brake beams extending at their ends through said openings.

3. A car truck comprising axle members extending from side to side of the truck, wheels on the ends of said axle members, antifriction bearings in which said axle members are mounted, truck side frames connecting said axle members, said truck side frames having openings therethrough and a brake beam carrying brakes for said wheels, said brake beam extending through said openings in said truck side frames.

4. A car truck comprising axle members, wheels, truck side frames having upper and lower longitudinal members that converge near their ends and have jaws at their ends engaging said axle members, said truck side frames also having vertical members connecting said longitudinal members, and a brake beam carrying brakes for said wheels, said brake beam extending through openings in said truck side frames formed by said vertical members and said converging end portions of said longitudinal members.

5. A railway car truck comprising axles, wheels thereon, tubular housings for said axles, truck side frames connecting said housings and disposed inside the lines of said wheels, said truck side frames having openings therethrough and brake beams carrying brakes for said wheels and extending through said openings, said openings being sufficiently large to accommodate the necessary movement of the brake beams in applying and releasing the brakes.

6. A railway car truck comprising axles, wheels thereon, tubular housings for said axles, truck side frames connecting said housings and disposed inside the lines of said wheels, said truck side frames having upper and lower longitudinal members that converge near their ends and vertical members connecting said longitudinal members and brake beams carrying brakes for said wheels and extending through the openings in said side frames formed by said vertical members and said converging portions of said longitudinal members.

7. A railway car truck comprising axles, wheels thereon, tubular housings for said axles, antifriction bearings interposed between said axles and the ends of said housings, truck side frames connecting said housings, said truck side frames having openings therethrough and brake beams extending at their ends through said openings.

Signed at Canton, Ohio, this 1st day of Aug., 1927.

OSCAR J. HORGER.